United States Patent [19]

Shinonome et al.

[11] Patent Number: 5,055,337
[45] Date of Patent: Oct. 8, 1991

[54] POLYESTER FILM

[75] Inventors: Osami Shinonome; Minoru Kishida; Tomoyuki Izumi; Kunio Murakami; Akira Menju, all of Uji, Japan

[73] Assignee: Unitika Ltd., Amagasaki, Japan

[21] Appl. No.: 520,062

[22] Filed: May 3, 1990

[30] Foreign Application Priority Data

May 15, 1989 [JP] Japan .................................. 1-122027
Aug. 22, 1989 [JP] Japan .................................. 1-216624

[51] Int. Cl.$^5$ ............................................. C08L 67/02
[52] U.S. Cl. .................................. 428/147; 428/338; 525/425
[58] Field of Search ................ 525/425; 428/147, 338, 428/475.2

[56] References Cited

U.S. PATENT DOCUMENTS 3,419,460  12/1968  Ure ........................................ 428/338
3,958,064   5/1976  Brekken .
4,615,939  10/1986  Corsi .................................... 428/323

FOREIGN PATENT DOCUMENTS 1195153  6/1970  United Kingdom ................. 525/425

OTHER PUBLICATIONS

Patent Abstracts of Japan, unexamined applications, C field, vol. 5, No. 28, Feb. 20, 1981, The Patent Office Japanese Government, p. 158 C 44, *Kokai-No. 55-155 029 (Daiafoil K.K.)*.

Primary Examiner—Patricia Short
Attorney, Agent, or Firm—Oblon, Spivak, McClelland, Maier & Neustadt

[57]                  ABSTRACT

A polyester film made of a mixture comprising a thermoplastic polyester (A) as a matrix component and a thermoplastic polyamide (B) having a glass transition temperature higher than the thermoplastic polyester (A), as a dispersed component, or a laminated film having a surface layer made of said mixture, wherein the film surface has fine protuberances formed with said thermoplastic polyamide (B) as nuclei.

7 Claims, No Drawings

POLYESTER FILM

The present invention relates to a polyester film having a uniformly controlled surface roughness useful in the fields of mat films, magnetic tapes, capacitors and packaging and which is excellent in the productivity.

Polyester films, particularly polyethylene terephthalate films, are excellent in the mechanical properties, thermal properties and chemical resistance, and they are widely used in various fields. However, as is well known, the surface roughness of the films is very important in their processing or applications, and a number of methods have been employed for the control of the surface roughness.

For example, in the field of mat films, in order to provide a relatively high level of surface roughness, it is known to employ a so-called sand blasting method wherein the film surface is roughened by blasting hard particulate sand or the like, to the film surface, a method in which a resin containing inorganic particles, is coated on the film surface, a method in which inorganic particles such as silica or titanium oxide particles are preliminarily kneaded into the film-forming resin, or a chemical etching method wherein the film surface is eroded by an acid, an alkali or a solvent. In the surface roughening of polyester films, a sand blasting method or a coating method is mainly used. On the other hand, it has been proposed to roughen the surface by adding an organic synthetic resin. For example, Japanese Examined Patent Publication No. 12368/1980 discloses a combination of a linear polyester resin and a polycarbonate and at least two types of other high molecular weight polymers; Japanese Examined Patent Publication No. 28096/1983 discloses a combination of a linear polyester resin and a phenoxy resin; and Japanese Examined Patent Publication No. 28097/1983 discloses a combination of linear polyester resins. However, in each of these methods, it is necessary to introduce a large amount of the additional resin to sufficiently attain the surface roughening, whereby there have been pointed out drawbacks such that the production cost is high, the surface roughness is so coarse that the product value tends to be poor, and the mechanical properties of the film tend to be low.

On the other hand, in the fields of magnetic tapes, capacitors, electrical insulating materials, transferring and packaging, the slipping properties of the films are very much influential over the handling efficiency during the process for their preparation or during the post processing steps, or over the quality of their products. Therefore, it is required to provide relatively fine roughness on the surface of the films so as to reduce the contact area between the films themselves or with other contacting objects. For this purpose, an inner particle-forming method or a precipitation method i.e. a method for precipitating fine inorganic particles in the system from the residual catalyst during the synthesis of a polyester, or an addition method i.e. a method of adding inorganic fine particles from outside the reaction system during the synthesis of a polyester, is mainly employed. However, these methods have problems such that it is difficult to control the amount or the particle size of the precipitating particles, the inorganic particles can hardly be uniformly dispersed in an organic polyester and tend to undergo coagulation to form coarse particles. The presence of such coarse particles is, for example, likely to cause dropouts in the case of magnetic video tapes and thus leads to a fatal defect. Further, if a non-stretched film of a polyester containing inorganic particles, is stretched, voids are likely to form along the boundaries of the particles and the polyester, whereby the particles tend to fall off from the film when the film is brought in contact with other materials during the processing or during its use, and thus so-called abraded powder is likely to form. An organic synthetic resin is regarded as excellent in the affinity and in the dispersing property for the above inorganic particles. A typical application example is the dispersion of close-linked acrylate resin particles into a polyester, as disclosed in e.g. Japanese Unexamined Patent Publications No. 155029/1980 and No. 178144/1988. However, if this is actually tried, it is very difficult to control the surface roughness of the obtained film, probably because due to the ester exchange reaction which takes place between the ester linkage in the polyester backbone chain and the ester linkage of the acrylate side chain during the melt mixing or during the film-forming from the melt, the state of the contact interface of the two, delicately changes (probably a three dimensional compound of the polyester will form). Further, with such a method of adding organic synthetic particles, it is usually necessary to have a step of adjusting particles such as disintegration, pulverization or classification prior to the incorporation to a polyester, which leads to complexity of the process, such being undesirable.

It is an object of the present invention to solve the above problems relating to the formation of surface roughness to the polyester films. The present invention has been accomplished on the basis of a discovery that to accomplish the object, it is effective to incorporate a thermoplastic polyamide having a high glass transition temperature to a film-forming polyester. The film of the present invention has a controlled surface roughness and thus is useful in various fields.

The present invention provides a polyester film made of a mixture comprising a thermoplastic polyester (A) as a matrix component and a thermoplastic polyamide (B) having a glass transition temperature higher than the thermoplastic polyester (A), as a dispersed component, or a laminated film having a surface layer made of said mixture, wherein the film surface has fine protuberances formed with said thermoplastic polyamide (B) as nuclei.

Now, the present invention will be described in detail with reference to the preferred embodiments.

In the present invention, typical examples of the thermoplastic polyester (A) include polyethylene terephthalate (PET), polybutylene terephthalate (PBT), polyethylene-2,6-naphthalate (PEN), poly-1,4-cyclohexylene dimethylene terephthalate (PCT) and poly-p-ethyleneoxy benzoate (PEOB). These polyesters fully satisfy the requirements for the properties and the costs for the film-forming polyester. Here, the glass transition temperature (hereinafter referred to simply as Tg) of the thermoplastic polyester (A) plays an important role in the relation to Tg of the thermoplastic polyamide (B), and it can be measured by a DSC method. Generally, Tg of PET is 70° C., Tg of PBT is 50° C., Tg of PEN is 120° C., Tg of PCT is 95° C., and Tg of PEOB is 60° C. Needless to say, other components may be incorporated as copolymer components to these thermoplastic polyesters so long as the film-forming properties are not impaired, and the polyester may be a polyester mixture of e.g. PET and PBT.

The thermoplastic polyamide (B) to be used in the present invention is a thermoplastic polyamide having Tg higher than the thermoplastic polyester (A). This requirement relating to the Tg is based on the following reason.

Namely, the thermoplastic polyester (A) and the thermoplastic polyamide (B) are melt-mixed so that the thermoplastic polyester (A) constitutes a matrix and the thermoplastic polyamide (B) forms a dispersed component, and then the mixture is extruded into a film and further stretched to obtain a surface-roughened film. If the Tg of the thermoplastic polyamide (B) is low, it will be stretched together with the thermoplastic polyester (A) during the stretching, and the thermoplastic polyamide (B) will not serve as nuclei, whereby the necessary protuberances of the film surface will not be obtained.

The difference in Tg between the thermoplastic polyester (A) and the thermoplastic polyamide (B) is preferably at least 20° C., more preferably at least 30° C.

As such a high Tg polyamide, there may be suitably employed a polyamide which contains, as a copolymer component, a component such as 5-tert-butylisophthalic acid, 1,1,3-trimethyl-3-phenylindane-3′,5-dicarboxylic acid, 3-aminomethyl-3,5,5-trimethyl-cyclohexylamine, 1,3-diaminocyclohexane, methaxylylenediamine, 1,3-bis(aminomethyl)cyclohexane, 2,4,4-trimethyl hexamethylenediamine, bis(4-aminocyclohexyl)methane or bis(3-methyl-4-aminocyclohexyl)methane. Such a polyamide can be obtained by polycondensing such a copolymer component with a proper combination of a polyamide-forming component such as ethylenediamine, tetramethylenediamine, hexamethylenediamine, phenylenediamine, adipic acid, sebacic acid, cyclohexane dicarboxylic acid, isophthalic acid, terephthalic acid, naphthalene dicarboxylic acid, $\epsilon$-aminocapronic acid, $\omega$-aminododecanoic acid, aminobenzoic acid or $\epsilon$-caprolactam, by a usual conventional method. The higher the Tg of the thermoplastic polyamide (B), the more readily the surface roughening effects will be obtained. However, in view of the polycondensation efficiency or the processability during the melt molding, it is preferably not higher than 200° C.

In the polyester film of the present invention, the thermoplastic polyamide (B) is dispersed as a dispersed component in the thermoplastic polyester (A) as the matrix. The thermoplastic polyamide (B) are preferably spherical as far as possible, and it is preferably present in the form of particles having a particle size of a submicron to micron order. In the case of ellipsoidal particles, the ratio of the long diameter to the short diameter is preferably at most 2.0, more preferably at most 1.5.

In the film of the present invention, the thermoplastic polyamide (B) serves as nuclei for the formation of fine protuberances on the film surface. The larger the amount of the thermoplastic polyamide (B) and the larger the particle size, the more remarkable the surface roughness of the film becomes. For its use as a mat film, the center surface average roughness (SRa) is preferably from 0.1 to 3 $\mu$m, more preferably from 0.2 to 2.5 $\mu$m. For its use as a magnetic tape or for packaging, SRa is preferably from 0.003 to 0.7 $\mu$m and its ten point average roughness (SRz) is from 0.03 to 1.5 $\mu$m. The amount of the thermoplastic polyamide (B) to be incorporated, is adjusted depending upon such a desired surface roughness. As a rough estimate, in the case of a mat film, the amount of the thermoplastic polyamide (B) is usually within a range of from 5 to 20% by weight, and in the case of a magnetic tape, it is usually within a range of from 0.001 to 3% by weight. Here, SRa is an average distance of the peaks of mountains and the bottoms of the valleys from a center surface when the plane where the sum of the areas of mountains and the sum of the areas of valleys on the film surface are equal, is taken as the center surface. SRz represents the difference between the average height of five highest mountains and the average depth of the five deepest valleys on the film surface taking the center surface as the reference plane. In the film of the present invention, SRz is sufficiently small as compared with SRa. Namely, the film has a uniformly controlled surface roughness. SRa and SRz can be measured, for example, by a three dimensional surface roughness meter, manufactured by Kosaka Kenkyusho K.K.

The film of the present invention may be a single layer film made of the composition comprising the thermoplastic polyester (A) and the thermoplastic polyamide (B), or may be in the form of a multi-layered film. The latter is a film in which a layer made of said composition is laminated with other polymer layer so that the layer made of said composition constitutes a surface layer on one side or each side of the film. Such a laminated film serves for the improvement of the mechanical properties or the reduction of the costs. As such other polymer, a polyester such as PET, PBT, PEN, PCT or PEOB is preferably used from the viewpoint of the mechanical properties and production efficiency.

The film of the present invention can be prepared usually by a conventional method. Namely, the thermoplastic polyester (A) and the thermoplastic polyamide (B) are melt-mixed by a single screw or a twin screw extruder to finely disperse the thermoplastic polyamide (B) into the thermoplastic polyester (A), and the mixture thereby obtained is by itself, or together with other polymer, melt-extruded from a T-die or a circular die in the form of a film and then cooled by a casting roller or by a gas or liquid. The non-stretched film thus obtained is then monoaxially or biaxially stretched. The non-stretched film has a surface roughness which is relatively smooth, and roughness appears when such a film is stretched. The stretching temperature is preferably at a level intermediate between the Tg of the thermoplastic polyester (A) and the Tg of the thermoplastic polyamide (B). At a temperature lower than the Tg of the thermoplastic polyester (A), the stretchability is poor. On the other hand, if the temperature is higher than the Tg of the thermoplastic polyamide (B), it becomes difficult to obtain good surface roughness. The stretching rate is preferably at least 1.5 times in the case of a monoaxial stretching. By biaxial stretching, an even better film is obtainable. In this case, it is preferred to stretch the film at a stretching rate of at least 1.5 times in each of the longitudinal and transverse directions.

There is no particular restriction as to the method for stretching the film. Monoaxial stretching, successive biaxial stretching or simultaneous biaxial stretching may be employed. The stretching apparatus may likewise be, for example, a double roller monoaxial stretching machine, a tenter-type transverse stretching machine or a tenter type or tubular type simultaneous biaxial stretching machine.

To the film of the present invention, inorganic additives such as silica, titanium oxide, calcium carbonate, alumina, kaolin, mica and talc, may be incorporated within a range not to impair the effects of the present invention.

Now, the present invention will be described in further detail with reference to Examples. However, it should be understood that the present invention is by no means restricted by such specific Examples.

REFERENCE EXAMPLE

Preparation of High Tg Polyamide 10 kg of starting material comprising 45 mol % of isophthalic acid, 5 mol % of terephthalic acid, 45 mol % of hexamethylenediamine, 5 mol % of bis-(4-amino-3-methylcyclohexyl)methane and 0.015 mol % of acetic acid, was charged together with 8 kg of water, to a reactor, and the air in the reactor was purged with nitrogen a few times. The temperature was raised to 90° C. and the reaction was conducted for about 5 hours, and then the reaction temperature was gradually raised to 280° C. over a period of 10 hours under stirring under a pressure of 18 bar.

Then, the pressure was released and reduced to atmospheric pressure, and the polymerization was conducted at the same temperature for 6 hours. After completion of the reaction, the product was taken out from the reactor and cut into pellets. The relative viscosity of this polyamide was 1.50 as measured at 20° C. at a concentration of 1 g/dl in m-cresol, and Tg was 150° C.

EXAMPLES 1 to 3

PET (A-1) and the polyamide (B-1) obtained in the Reference Example were melt-mixed in the proportions varied as identified in Table 1, at 280° C. by means of a twin screw extruder and formed into chips.

Then, the chips were melted at 280° C. in a 50 mmΦ extruder and extruded through a T-die to form a film having a thickness of about 50 μm. The non-stretched film thus obtained was monoaxially stretched three times at 90° C. by a double roller monoaxial stretching machine. The compositional conditions are shown in Table 1. All of the stretched films were excellent in the mechanical properties and in the writing properties.

TABLE 1

| Example Nos. | Weight ratio of A-1 to B-1 | Mechanical properties | Writing properties | Evaluation |
|---|---|---|---|---|
| Example 1 | 92:8 | Good | Fair | Pass |
| Example 2 | 85:15 | Good | Good | Pass |
| Example 3 | 73:27 | Fair | Good | Pass |

EXAMPLE 4

The non-stretched film in Example 2 was simultaneously bistretched at 100° C. 3.3 times in each of the longitudinal and transverse directions, followed by heat setting at 230° C. The properties of the stretched film thus obtained were excellent as shown in Table 2.

TABLE 2

| Test items | Units | Numerical values |
|---|---|---|
| Breaking strength | kg/mm$^2$ | 17.2 |
| Breaking elongation | % | 78 |
| Heat shrinkage (160° C. × 15 min.) | % | 1.2 |
| Surface roughness (SRa) | μm | 0.95 |

(Measuring direction: Longitudinal direction of the film)

EXAMPLE 5

By means of a co-extrusion film-forming apparatus provided with three extruders of 40 mmΦ, a non-stretched film was prepared which was laminated so that a polyethylene terephthalate layer of 300 μm was located at the center and the resin mixture layer having the same composition as in Example 2 and having a thickness of 100 μm was located on each side. This non-stretched film was stretched 3.3 times in the longitudinal direction at 90° C. by a roller-type longitudinal stretching machine, and then stretched 3.4 times in the transverse direction at 100° C. by a tenter-type stretching machine, followed immediately by heat setting at 230° C.

The surface roughness of the stretched film was large as shown in Table 3, and the writing properties were also excellent. Further, the mechanical properties were excellent as shown in Table 3.

TABLE 3

| Test items | Units | Numerical values |
|---|---|---|
| Breaking strength | kg/mm$^2$ | 20.2 |
| Breaking elongation | % | 97 |
| Heat shrinkage (160° C. × 15 min.) | % | 1.0 |
| Surface roughness (SRa) | μm | 0.97 |

(Measuring direction: Longitudinal direction of the film)

EXAMPLE 6 and COMPARATIVE EXAMPLES 1 and 2

In the Reference Example, polycondensation was conducted by using sebacic acid instead of terephthalic acid, to obtain a polyamide (B-2) having a Tg of 118° C. By using this polyamide (B-2) and the above-mentioned polyamide (B-1) and PEN (A-2), a monoaxial stretching test was conducted in substantially the same manner as in Examples 1 to 3 at the stretching temperature and with the composition as identified in Table 4. As is evident from this Table, the Tg of the polyamide and the stretching temperature play very important roles for the surface roughening of the film.

TABLE 4

| Example Nos. | Composition (parts by weight) (A-2):(B-1):(B-2) | Stretching temp (°C.) | Writing properties |
|---|---|---|---|
| Example 1 | 85:15:0 | 140 | Good |
| Comparative Example 1 | 85:15:0 | 160 | Poor |
| Comparative Example 2 | 85:0:15 | 140 | Poor |

EXAMPLES 7 to 13

Pellets of PET (A-1) and pellets of the polyamide (B-1) obtained in the Reference Example were blended in various proportions as identified in Table 5, and the mixture was melt-mixed at 180° C. by a melt extruder and extruded through a T-die to form a film having a thickness of about 200 μm. The non-stretched film thereby obtained, was simultaneously bistretched 3.3 times in each of the longitudinal and transverse directions at 100° C., followed by heat setting at 230° C. The blending proportions and the surface roughness, static frictional coefficient and mechanical properties of the films thus obtained are shown in Table 5. As is evident from the Table, the effects of the present invention were confirmed by these Examples.

Further, each stretched film was cooled by liquefied nitrogen and then split in each of the longitudinal direction (MD direction) and the width direction (TD direction) of the film, and the cross sections were photographed by a scanning electron microscope with 3000 magnifications, whereby in each film it was observed that the polyamide (B-1) was distributed in the form of ellipsoidal particles of from 0.5 to 1 μm order and with a long diameter/short diameter ratio of from 1.0 to 1.5.

TABLE 5

| Example Nos. | Amount of B-1 (% by weight) | Properties of the stretched films | | | | |
|---|---|---|---|---|---|---|
| | | SRa (μm) | Srz (μm) | Static friction coefficient | Strength (kg/mm²) | Elongation (%) |
| Example 7 | 0.001 | 0.003 | 0.037 | 0.62 | 23 | 108 |
| Example 8 | 0.01 | 0.008 | 0.096 | 0.53 | 23 | 110 |
| Example 9 | 0.10 | 0.013 | 0.17 | 0.45 | 23 | 110 |
| Example 10 | 0.50 | 0.022 | 0.36 | 0.41 | 22 | 107 |
| Example 11 | 1.0 | 0.027 | 0.58 | 0.32 | 22 | 105 |
| Example 12 | 2.0 | 0.030 | 0.82 | 0.28 | 22 | 106 |
| Example 13 | 3.0 | 0.058 | 1.34 | 0.22 | 21 | 102 |

Note: The values for the strength and elongation are values measured in the width direction of the film.

COMPARATIVE EXAMPLE 3

A test was conducted under the same conditions as in Example 3 by using pellets of PET (A-1) and pellets of a polyamide (B-3) composed mainly of a polyhexamethylene adipamide. The stretched film thereby obtained had a SRa of 0.002 μm and a SRz of 0.060 μm. The cross sect the film were observed by an electron microscope, whereby it was found that the polyamide (B-3) was distributed in the form of fine streaks directed in the longitudinal direction of the film.

We claim:

1. A polyester film made of a mixture comprising a thermoplastic polyester (A) as a matrix component and a thermoplastic polyamide (B) having a glass transition temperature higher than the thermoplastic polyester (A), as a dispersed component, or a laminated film having a surface layer made of said mixture, wherein the film surface has fine protuberances formed with said thermoplastic polyamide (B) as nuclei.

2. The polyester film according to claim 1, wherein the thermoplastic polyester (A) is polyethylene terephthalate, polybutylene terephthalate, polyethylene-2,6-naphthalate or poly-1,4-cyclohexylene dimethylene terephthalate, and the thermoplastic polyamide (B) has a glass transition temperature higher by at least 20° C. than the thermoplastic polyester (A).

3. The polyester film according to claim 1, wherein the amount of the thermoplastic polyamide (B) in said mixture is from 5 to 20% by weight, and the center surface average roughness of the film is from 0.1 to 3 μm.

4. The polyester film according to claim 1, wherein the amount of the thermoplastic polyamide (B) in said mixture is from 0.001 to 3% by weight, the center surface average roughness of the film is from 0.003 to 0.7 μm, and the ten point average roughness is from 0.03 to 1.5 μm.

5. The polyester film according to claim 1, wherein the thermoplastic polyamide (B) has a glass transition temperature higher by at least 20° C. than the thermoplastic polyester (A).

6. The polyester film according to claim 1, wherein the thermoplastic polyamide (B) has a glass transition temperature higher by at least 30° C. than the thermoplastic polyester (A).

7. The polyester film according to claim 2, wherein the thermoplastic polyamide (B) has a glass transition temperature higher by at least 30° C. than the thermoplastic polyester (A).

* * * * *